United States Patent [19]

Berkhout

[11] Patent Number: 4,815,963
[45] Date of Patent: Mar. 28, 1989

[54] DRAINAGE MAT WITH HIGH CRUSHING STRENGTH AND WASTE-DUMP BASE CONTAINING SAID MAT

[75] Inventor: Henny Berkhout, Arnhem, Netherlands

[73] Assignee: Akzo NV, Netherlands

[21] Appl. No.: 63,464

[22] Filed: Jun. 18, 1987

[30] Foreign Application Priority Data

Jun. 18, 1986 [DE] Fed. Rep. of Germany ....... 3620388

[51] Int. Cl.$^4$ .............................................. B32B 5/16
[52] U.S. Cl. ....................................... 128/283; 428/72; 428/73; 428/117; 428/178; 428/284; 428/298; 428/325
[58] Field of Search ............... 428/283, 287, 296, 298, 428/325, 72, 73, 117, 178

[56] References Cited

U.S. PATENT DOCUMENTS

| | | | |
|---|---|---|---|
| 2,686,655 | 8/1954 | Schörner | 253/77 |
| 4,177,312 | 12/1979 | Rosen et al. | 428/284 |
| 4,250,172 | 2/1981 | Mutzenberg et al. | 428/234 |
| 4,323,623 | 4/1982 | Ahrens et al. | 428/325 |
| 4,424,248 | 1/1984 | Tesch et al. | 428/283 |
| 4,495,235 | 1/1985 | Tesch | 428/282 |
| 4,530,869 | 7/1985 | Tesch | 428/284 |
| 4,578,068 | 3/1986 | Kramer et al. | 428/283 |
| 4,622,260 | 11/1986 | Tesch | 428/283 |

*Primary Examiner*—James J. Bell
*Attorney, Agent, or Firm*—Parkhurst, Oliff & Berridge

[57] ABSTRACT

Drainage mats with high compression resistance comprising two fabrics and grains fixedly arranged therebetween, wherein the grains are placed in one layer and are spaced a distance of at least 50% of the average grain size. One of the two fabrics is basically a filter layer, whereas the second fabric can be a filter layer or a tightly woven strip. In addition, a three-dimensional mat with positioning seats for the grains can be placed between the two fabrics. This drainage mat is suitable for constructing waste-dump bases.

12 Claims, 4 Drawing Sheets

DRAINAGE MAT WITH HIGH CRUSHING STRENGTH AND WASTE-DUMP BASE CONTAINING SAID MAT

TECHNICAL FIELD

The subject matter of the present invention is a drainage mat with high compression resistance, comprising two fabrics and grains fixedly arranged therebetween, as well as a waste-dump base containing such drainage mats.

BACKGROUND OF THE INVENTION

This type of drainage mat is old in the art (cf. West German Laid-open Application Nos. 2,248,911, 2,263,846, 2,327,618, 2,551,267). In these drainage mats of known construction, the grains are arranged in multilayers and are in contact with one another. This type of packing results in a small water-removal capacity for these known drainage mats, so that they become thick if the water-removal capacity is to be increased, resulting in a large increase in the weight per square meter of such drainage mats. The grains can be secured only by the two fabrics, resulting in mutual displacement of the grains and thereby in frictional stress on the fabrics during compression loading. Frequently, the fabrics cannot be prevented from tearing open. In other cases, the grains are held in place by stitching-through fibers from the two fabrics or by spraying binders. Such drainage mats are very expensive to make. The free space for the water removal is further reduced by the stitched-through fibers or by the binder. In such drainage mats, one of the fabrics is basically a filter layer, e.g. a filament layer or nonwoven fabric, while the other fabric can be a filter layer or a tightly woven sheet, e.g. a film.

SUMMARY OF THE INVENTION

An object of the present invention is to provide a drainage mat and a waste-dump base of the type referred to above, which, even under very high compression load, is at worst slightly squeezed together and which exhibits an eminent drainage effect of a particularly high water-removal capacity.

This and other objects are achieved with a drainage mat of the type mentioned above by arranging the grains in a single layer and spacing them by a distance of at least 50% of the average grain size.

BRIEF DESCRIPTION OF THE DRAWINGS

The invention will be explained in greater detail by reference to the accompanying figures, in which.

DETAILED DESCRIPTION OF PREFERRED EMBODIMENTS

The term "grains" includes practically all granular products such as beads, pebbles, and granulates. These grains do not necessarily have to be compact and/or consist only of one material. They may also be designed as hollow bodies. Bodies such as, for example, those used to increase the wetting surfce of air scrubbers or air humidifiers, e.g. the so-called Raschig rings, also fall under the term "grains" as used herein. Preferably, mineral substances, plastic materials or expandable plastics are suitable as the material for the grains.

The grains must have at least a bursting pressure greater than the square load prevailing at the site where the drainage mat is used. For example, the grains in the arrangement in which they are placed in the drainage mat must withstand a square load of more than 8, preferably more than 10, bar, i.e., they must not burst, if these grains are to be suitable for a drainage mat which must have a crushing resistance of 8 bar for its special field of application.

Figure 1:
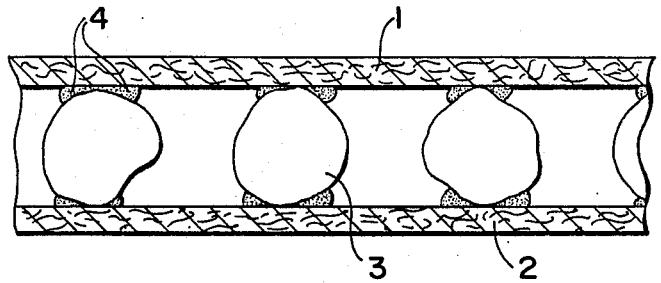
FIG. 1 is a schematic cross section through a drainage mat having two filter layers and grains.

The grains are held in place in the drainage mat whenever they are secured at least approximately in their position. They can be bonded to the fabric. They can also be kept apart by other means. As an example, the grains can be spaced apart by a perforated plate, the holes of which can be larger than the grains. The perforated plate can serve as a production aid in order, for example, to make a drainage mat having only grains and fabrics (FIG. 1). However, it can also be arranged in the drainage mat, if it is designed as a three-dimensional fabric (perforated plate of suitable thickness, perforated profiled plate, perforated plate with webs of suitable thickness). In this case, the grains are fixed in their position, but can move therearound a bit.

From the modulus point of view, the fabrics must be disposed such that during loading they sag as little as possible between the grains. Mainly sheets, usually 0.1 to 2 mm thick, come into consideration as the densely woven fabric. Practically all fabrics are suitable as the filter layers, such as nonwoven fabrics, woven fabrics, or lays, all of which are characterized by the fact that water can flow through practically without impediment, and also that not only are the grains held in place inside the mat, but also that solids cannot penetrate thereinto. Preferably, they are 0.7 to 8 mm thick.

However, even filter layers with relatively low tensile strength come into consideration, provided they are reinforced with appropriate tension-resistant reinforcing lays, for example, lattice fabrics.

The drainage mats according to the invention can be made in simple fashion by first spot-gluing an adhesive onto one fabric, e.g. by means of a roller with spaced-apart bumps, then applying the grains thereonto. After the adhesive has set or hardened, the grains not bonded to the fabric can again be removed, by transporting the fabric further, this time with the grains downward. An adhesive is again applied onto the grains bonded to the first fabric, for example, by means of a coating roller, onto the side of the grains facing away from the first fabric, and the second fabric is pressed on.

The drainage mat then has a sufficiently uniform thickness if the cross-sectional dimensions of the grains are as uniform as possible. This also leads to a uniform load on the fabrics.

With drainage mats embodying the invention, it has proved advantageous if, prior to being incorporated into the drainage mat, the grains were classified by screening. During the screening by size separation, all the coarse grains are first separated by screening with a screen with a relatively large mesh width, then the fine grains are removed by a screen with a relatively small mesh width. During the screening, the size of these grains is defined by indicating the mesh width of the two screens used for size separation. For example, if the first screen has a mesh width of 11 mm and the second screen has a mesh width of 9 mm, the grain size is indicated as 9–11.

With the drainage mats according to the invention, it is now of advantage if they contain grains which are classified by screening with screen plates having round or square openings in such a way that the maximum difference between the smallest and the largest grain size is 3 mm, preferably 2 mm. If, for example, the difference between the smallest and the largest grain size is 2 mm, i.e., if grains with a grain size of, for example, 9–11, 24–26 or 29–31 are used for making drainage mats according to the invention, the grains were classified by two screens, the mesh widths of which differ by 2 mm, e.g. the first screen has a mesh width of 11 mm and the second screen has a mesh width of 9 mm (or the first screen has a mesh width of 26 mm and the second screen has a mesh width of 24 mm, or the first screen has a mesh width of 31 mm and the second screen has a mesh width of 29 mm). Here, perforated plates or screen fabrics with round or square openings come into consideration as screen plates.

The drainage mat according to the invention can be made in a particularly simple manner by arranging between two fabrics a three-dimensional mat with positioning seats for the grains, the mat being bonded at least by spot-gluing to at least one fabric.

Three-dimensional mats incorporating the invention can be profiled sheets or plates, preferably having a honeycomb structure; layers from polymer wires, metal wires or ropes, the structural thickness of which corresponds to more than 60% of the size of the grains; layers shaped into fabrics with honeycomb-like structure; etc.

A drainage mat has been found to be of particular advantage in which the three-dimensional mat comprises a large number of filaments having a diameter of 0.2 to 1.5 mm, melt-spun from synthetic polymers, crossing over one another one place at a time and being welded together at the crossover points, and having a thickness of 5 to 70 mm and a surface with a waffle-like structure with depressions, the depressions of the structured surface constituting positioning seats for the grains.

The structure arranged between the fabrics is herein referred to as the "mat" and, as a distinction, the structure which is made up of grains, fabrics and of sometimes a mat, is referred to as the "drainage mat".

A mat as described above is exemplified in West German Pat. No. 2,270,403. The known mats are used therein as a drainage layer, which is attached to at least one filter layer. Drainage mats containing such a mat have the disadvantage that they lose volume when the load per unit pressure is high, so that the water-removal capacity of such drainage mats is reduced. The mats have a structured surface usually consisting of uniformly distributed bumps and depressions. Grains can be spread very advantageously into these depressions, so that the grains are then spaced a distance defined by the depressions. The mat is attached at least on one side to the fabric, while the other fabric is attached to the grains and/or to the mat.

As a rule, it is sufficient for the thickness of the mat to be 60 to 100% of the average grain size. The grains are then attached to the first fabric and/or to the mat and to the second fabric, and the mat is attached to the first fabric. Here, the mat serves mainly to ensure a uniform distribution of the grains during the fabrication of the drainage mat.

In this case, it has proved particularly successful to attach the mat first to one of the fabrics. The grains can then be blended, e.g. in a mixer, to a binder, so that the grains are coated all over with binder. The grains coated with binder can then be spread onto the exposed, structured surface of the mat (on the side opposite one of the fabrics). Thereafter, the second fabric can be put on, so that the grains, after the binder has set, are attached on one side to the mat and on the other side to the second fabric.

If grains are used that can be attached to the fabrics only at great cost or cannot be attached thereto with the required degree of reliability, it is of particular advantage to provide a drainage mat in which the mat is attached to both fabrics and the size of the grains is 80 to 105% of the thickness of the mat. Here, the distribution of the grains is again ensured by the mat. The grains are then retained in the cavities formed from the mat and the fabric and are attached neither to the mat nor to the fabric. Such a mat is particularly suitable whenever use is made of porous grains or grains with cavities extending into the surface of the grains. Within the drainage mat, the pores or cavities of the grains are then not closed by adhesive or binder. When using grains with through-going cavities, the water-removal capacity of the drainage mat can then be increased still further.

Advantageously, filter layers may comprise a spunbonded fabric, whereby this spunbonded fabric is then advantageously welded to the bumps of the mat.

The diameter of the filaments of such a spunbonded fabric can vary within wide limits and, in particular, can also be much smaller than that of the filaments of the mat. Preferably, however, the filaments of the spunbonded fabric have approximately the same diameter as the filaments of the mat. Advantageously, the thickness of the spunbonded fabric favorably is between approximately 0.5 and 4 mm, whereas the thickness of the mat is preferably between 8 and 30 mm. Higher values would lead to an undesired increase of the weight per unit area. With greater values of the spunbonded fabric, the weight per unit area per unit thickness and/or the strength per unit weight per unit area in the longitudinal and transverse direction of the drainage mat is reduced.

The spunbonded fabric may consist of the same polymers as the mat. The strength of the welds and the strength in the longitudinal and transverse direction of the drainage mat can be affected by a suitable choice even of different polymers for mat and spunbonded fabric.

Preferably, practically all common melt-spun polymers, such as polyolefins, preferably polyethylene or polypropylene, polyamides, preferably polycaprolactam, polyesters, preferably polyethylene terephthalate, polyvinyl chloride or polycarbonate, are suitable for making the filter layers and the mat. The polymers can be modified by the addition of stabilizers or the like in a manner known in itself.

Gravel, pumice, expanded clay or glass can be used as the grains. As a rule, those grains are to be preferred that have the lowest possible specific gravity, such as expanded clay or hollow bodies from synthetic material. This minimizes the weight per unit area of the drainage mat.

The drainage mats according to the invention are particularly suitable for applications in which a good drainage effect must be ensured with a load per unit area of, for example, 2 to 8 bar. Therefore, the drainage mats are particularly suitable for drainage purposes in tunnel construction, in building and underground engineering, for example for constructing waste dumps or other facilities.

Preferably, the grains of the drainage mat are porous. Especially when the grains are to be attached to the fabric or to the mat, porous grains are particularly effective, because in this case the binder of the adhesives can penetrate into the pores of the grains, resulting in very strong attachments.

Objects of the invention are also achieved by a waste-dump base containing the drainage mat of the invention as the basic drainage layer, leakage-monitoring layer and/or capillary-breaking layer.

A waste-dump base within the context of the present invention is that part of a waste dump which is used to separate the natural soil from the dumped material.

In this case, it has proved particularly advantageous for the waste-dump base to consist of three laminated drainage mats made in accordance with the invention, with the outer fabric being designed as a filter layer and the inner fabric as a sealing strip, it being sufficient to provide only sealing strip between the mats. All three drainage mats can be attached to one another, so that the waste-dump base can be erected in a single operation.

FIG. 1 shows schematically a section through a drainage mat comprising two filter layers 1 and 2, and grains 3 spaced apart by bonding points 4. This mat can be made in a simple manner by the processes described above, but it is also possible to coat the grains with a binder or adhesive and then to spread them by means of a perforated plate which is spaced a distance of approximately 60% of the grain size above the lower filter layer. After removal of the perforated plate, the upper filter layer can be put in place.

Figure 2:
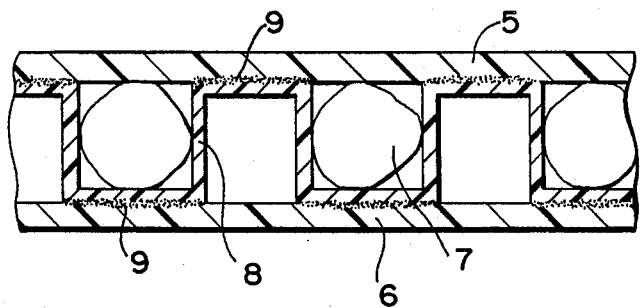
FIG. 2 is a schematic cross section through a drainage mat having two filter layers and attached to a mat placed therebetween.

FIG. 2 shows schematically a section through a drainage mat comprising two filter layers 5 and 6 which are attached to a mat 8 placed therebetween at points of attachment 9. If filter layers 5, 6 as well as mat 8 are formed from filaments of thermoplastic polymers, points of attachment 9 can be produced by fusing and pressing to one another the parts to be attached. These parts are then melted together permanently. Mat 8 shown in the illustrated drainage mat has substantially cubic bumps (upward) and depressions, one grain 7 being fixedly arranged in each cubic depression.

Figure 3:
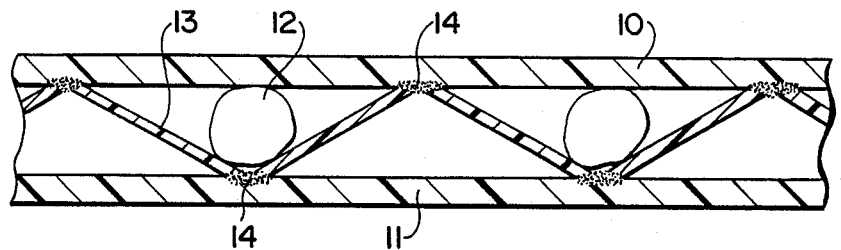
FIG. 3 is a schematic cross section through a drainage mat with two filter layers and with another structure of the mat placed therebetween, with the filter layers being attached to the mat.
Figure 4:
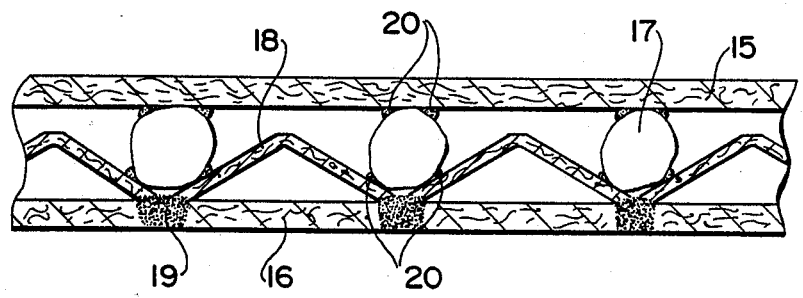
FIG. 4 is a schematic section through a drainage mat having two filter layers and a mat placed therebetween, with the mat being attached to one filter layer and the grains attached to the mat and to the second filter layer.

In FIGS. 3 and 4, mat 13 or 18 contained in the drainage mat has conical bumps or depressions, one grain 12 or 17 being placed in each depression.

In the drainage mat of FIG. 3 are shown the vertexes of the conical bumps with the upper filter layer 10 attaching the conical depressions to the lower filter layer 11 via bonding points 14. As a result, grains 12, which are embedded in the depressions of mat 13, are fixed in position.

In FIG. 4, mat 18 is spaced a distance from upper filter layer 15. Mat 18 is permanently attached by welding to lower filter layer 16, a spunbonded fabric. Grains 17 placed in the depressions of mat 18 are attached via bonding points 20 to mat 18 or to upper (second) filter layer 15. A mat strip made therefrom is particularly suitable for waste-dump construction.

Figure 5:
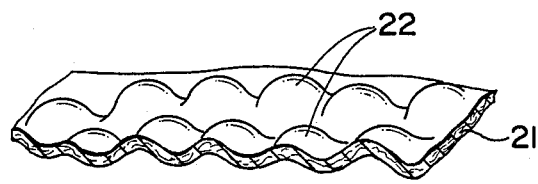
FIG. 5 is a perspective view of a mat which can be incorporated into the drainage mat of the invention.
Figure 6:
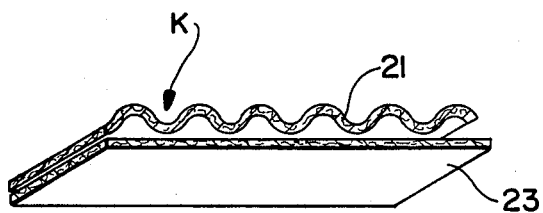
FIG. 6 shows the mat depicted in FIG. 5, attached to a spunbonded fabric as filter layer.

To illustrate how the surface with the waffle-like structure of the mats provided in the drainage mats of the invention may look like, such a mat 21 is shown in FIG. 5. This mat 21 has bumps 22 and depressions placed therebetween. In the example shown, bumps 22, and thereby the depressions, are shaped as hemispheres, but these bumps or depressions can also have the form of a cone, a truncated cone, a pyramid, a truncated pyramid, a cube or other conceivable shapes. It is essential that the depressions be so arranged that the grains, after being embedded therein (see arrow K in FIG. 6), are spaced approximately the same distance from one another.

FIG. 6 shows once again the mat of FIG. 5. Mat 21 is now attached to a filter layer 23. In this case, the grains are located in depressions (see arrow K).

Figure 7:
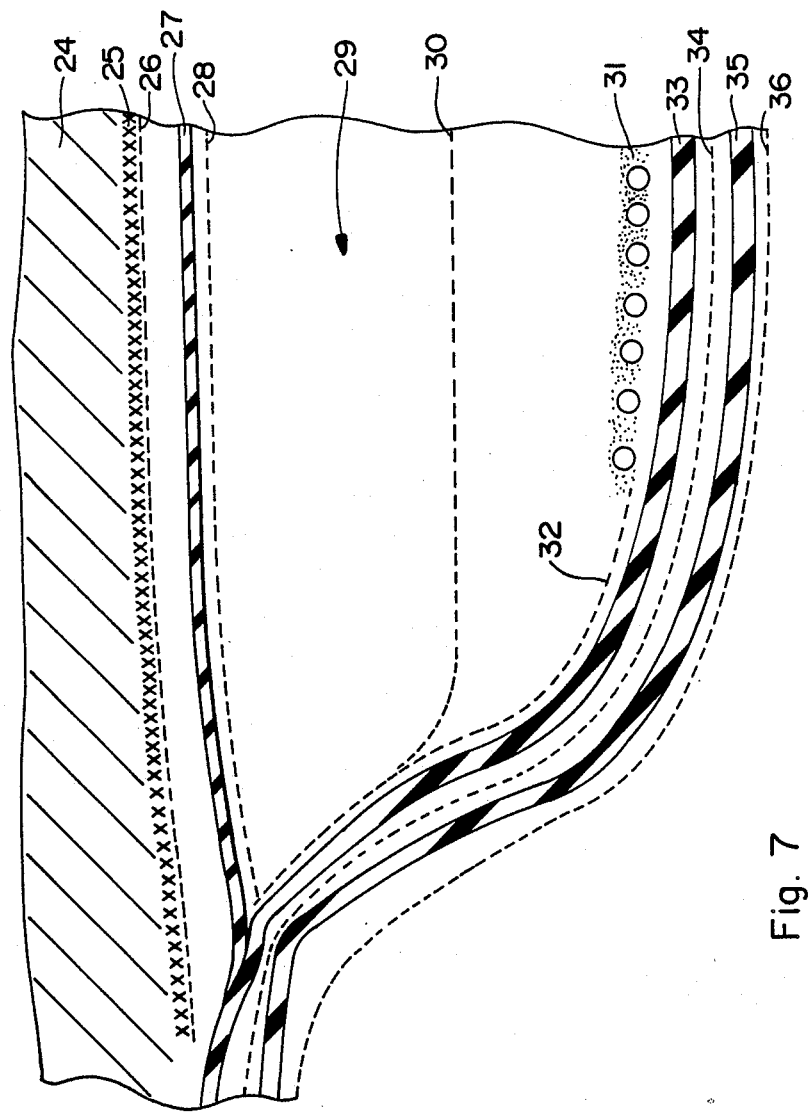
FIG. 7 is a schematic section through a waste-dump structure.

FIG. 7 is a schematic representation of the structure of a waste dump, in which 24 is a fill, which can be up to 2 m high, 25 is a warning layer, 26 is a top drainage and protective layer, 27 is a top seal, 28 is a top degassing layer, 29 is garbage, 30 is a garbage-degassing layer, 31 is base drainage, 32 is slope drainage, 33 is an upper base seal, 34 is a leakage-monitoring layer, 35 is a lower base seal, and 36 is a capillary-breaking layer.

The drainage mat according to the invention is particularly suitable for layers 30, 32, 34 and 36, but it can also be used for layers 26 and 28.

What is claimed is:

1. A drainage mat with a high compression resistance, comprising two fabrics and grains fixedly arranged therebetween, said grains being arranged in one one-grain-thick layer and being spaced apart by a distance of at least approximately 50% of the average grain size.

2. The drainage mat as set forth in claim 1, wherein all said grains are classified by screening by means of round and square sieve plates with perforated bottoms having round or square openings, such that a maximum difference between a smallest grain size and a largest grain size is 3 mm.

3. The drainage mat as set forth in claim 2, wherein said maximum difference between the smallest grain size and the largest grain size is 2 mm.

4. The drainage mat as set forth in claim 1, wherein a three-dimensional mat with positioning seats for the grains is arranged between the two fabrics, said mat being attached to at least one of the fabrics.

5. The drainage mat as set forth in claim 4, wherein said three-dimensional mat comprises a large number of filaments meltspun from synthetic polymers crossing over one another one place at a time and welded together at the crossover points, said filaments having a diameter of 0.2 to 1.5 mm, said three-dimensional mat having a thickness of 5 to 70 mm and a waffle-like structured surface with depressions, whereby the depressions of the structured surface are positioning seats for the grains.

6. The drainage mat as set forth in claim 5, wherein said three-dimensional mat is attached to a first fabric and the grains are attached to a second fabric and to at least one member selected from the group consisting of said first fabric and said three-dimensional mat, the grains being arranged only on one side of the structured surface of said three-dimensional mat.

7. The drainage mat as set forth in claim 6, wherein the thickness of the three-dimensional mat is 60 to 100% of the average grain size.

8. The drainage mat as set forth in claim 5, wherein said three-dimensional mat is attached to both said first fabric and said second fabric and the size of the grains is 80 to 105% of the thickness of the three-dimensional mat.

9. The drainage mat as set forth in claim 1, wherein said grains are selected from the group consisting of grains of gravel, pumice, expanded clay and glass.

10. The drainage mat as set forth in claim 1, wherein said grains are porous.

11. A waste-dump base, said waste-dump base comprising the drainage mat as set forth in claim 1 as a layer selected from the group consisting of a base drainage layer, a leakage-monitoring layer and a capillary-breaking layer.

12. A waste-dump base, said waste-dump base comprising a laminate of three drainage mats as set forth in claim 1, wherein said fabrics located on an outer surface of said laminate are adapted to act as filter layers and said fabrics located in an interior of said laminate are adapted to act as sealing strips.

* * * * *

UNITED STATES PATENT AND TRADEMARK OFFICE
CERTIFICATE OF CORRECTION

PATENT NO. : 4,815,963
DATED : March 28, 1989
INVENTOR(S) : Henny BERKHOUT

It is certified that error appears in the above-identified patent and that said Letters Patent is hereby corrected as shown below:

Title page:

IN THE ABSTRACT:

Line 1, change "compression resistance" to --crushing strength--.

IN THE SPECIFICATION:

Column 1, line 9, change "compression resistance" to --crushing strength--;

line 44, change "of" to --or--.

Column 2, line 13, change "surfce" to --surface--.

IN THE CLAIMS:

Claim 1, line 1, change "compression resistance" to --crushing strength--.

Signed and Sealed this

Sixth Day of February, 1990

*Attest:*

JEFFREY M. SAMUELS

*Attesting Officer*  *Acting Commissioner of Patents and Trademarks*